Figure 1:
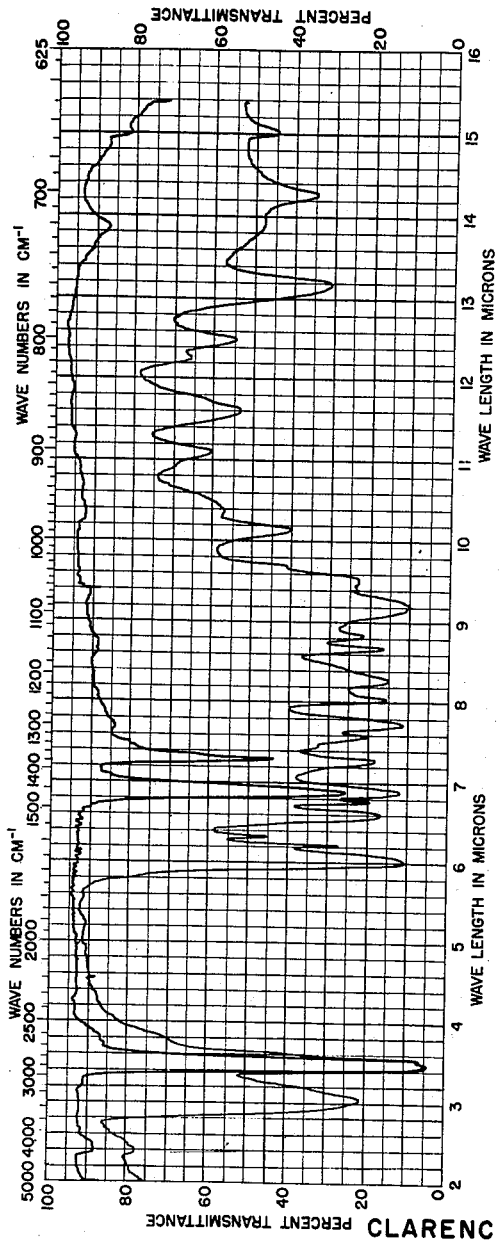

Infrared Absorption Spectrum - Mineral Oil Suspension
Celesticetin Oxalate

INFRARED ABSORPTION SPECTRUM—MINERAL OIL SUSPENSION
CELESTICETIN SALICYLATE

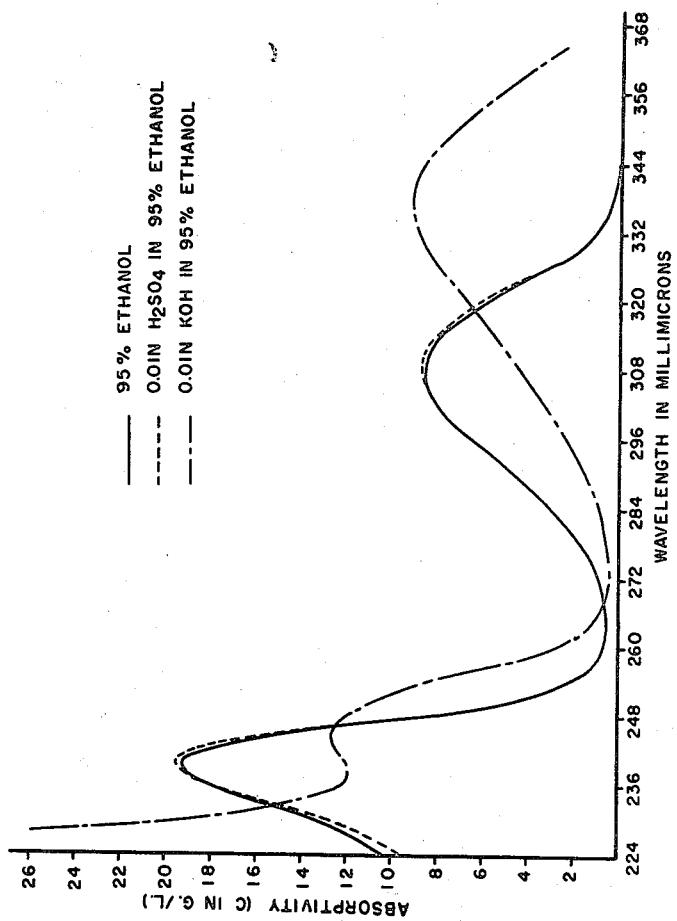

United States Patent Office 2,928,844
Patented Mar. 15, 1960

2,928,844
CELESTICETIN, ITS SALTS AND METHOD OF PREPARATION

Clarence De Boer, Kalamazoo Township, Kalamazoo County, Alma Dietz, Kalamazoo, and Herman Hoeksema, Kalamazoo Township, Kalamazoo County, all in Michigan, assignors to The Upjohn Company, Kalamazoo, Mich., a corporation of Michigan Application February 24, 1958, Serial No. 717,048

12 Claims. (Cl. 260—326.3)

This invention relates to novel compounds possessing antibiotic activity and to a process for the preparation thereof. More particularly, the invention relates to a novel composition of matter, celesticetin, formerly identified as Antibiotic D-52, to a process for its production by fermentation, to a method for its recovery and concentration from crude solutions including the fermentation broths, to its purification, and to its acid addition salts and the products thereof.

This application is a continuation-in-part of the pending application of Clarence De Boer et al., Serial No. 426,429, filed on April 29, 1954, and now abandoned.

It is an object of the present invention to provide a new and useful antibiotic which is active against bacteria, and more specifically, against gram-positive bacteria. Another object of this invention is to provide acid addition salts of this antibiotic. A further object is to provide a process for the production and recovery of this antibiotic. Other objects and features of the invention will be apparent to those skilled in the art to which this invention pertains.

It has been found that by cultivating, under controlled conditions and on suitable culture media, a hitherto undescribed species of microorganism isolated from a sample of soil taken in Utah, Streptomyces caelestis, a novel composition of matter, celesticetin, is obtained.

The new antibiotic of this invention has been shown to have the following structural formula:

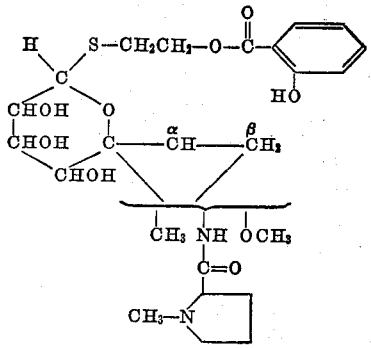

The brace indicates that the exact locations of the methyl, methoxy, and hygramido groups are not known. It is believed, however, that the hygramido group is attached to the α-carbon atom, the methoxy group to the β-carbon atom and the methyl group to the nuclear carbon atom. On this basis the new antibiotic has the following formula:

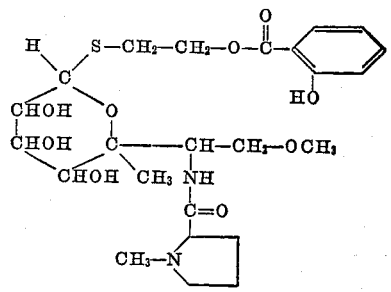

A culture of the living organism has been deposited with the Fermentation Division of the Northern Regional Research Laboratory at Peoria, Illinois, and has been added to its permanent collection as NRRL 2418.

A careful study of the morphology and physiology of S. caelestis shows it to be distinctly different from any previously described species of streptomyces in Bergey's "Manual of Determinative Bacteriology," 6th edition, pages 929 to 977, and Waksman and Lechevalier's "Actinomycetes and Their Antibiotics." The description is given below in tabular form. All seeding was done

TABLE I
Cultural characteristics of S. caelestis

| Medium | Amount of Growth | Color of Aerial Mycelium and Spores | Soluble Pigment | Remarks |
|---|---|---|---|---|
| Plain gelatin | good | blue gray | brown | liquefaction to depth of pigment. |
| 0.5% tryptone-0.3% yeast extract broth. | slight | blue white | do | |
| Tryptone broth | do | gray white | do | |
| Czapek's sucrose agar | good | white | yellow | |
| Waksman's starch agar B | none | none | none | |
| d Glucose agar | good | blue-gray-white | tan | |
| Nutrient agar | fair-good | slight pink-white | brown-tan | |
| d Glucose nutrient broth | good | none | tan | |
| Litmus milk | fair | slight | none | no peptonization or reduction. |
| Potato slant | good | grayish to blue white | brown | darkening of slant. |
| Carrot slant | do | slight, white with blue cast. | none | |
| Nutrient nitrate broth 0.1% KNO₃. | do | slight, blue-white | deep tan | no reduction in medium used. |
| Waksman's tyrosine agar | do | none | none | |
| Aqueous l-tyrosine (1%) | do | do | do | |
| Nutrient broth | do | slight, white | deep tan | |
| Peptone-iron agar | do | none | black-brown. | H₂S darkening. |
| Dorsett's egg slants | do | slight, lavender-white | brown | |
| Loeffler's serum slants | do | slight, pink lavender white. | do | |
| Bennett's agar | do | blue-white | tan-brown | | with a spore suspension, the test tubes containing the various culture media being incubated between 24 and 28 degrees centigrade. Readings were taken on the 4th, 7th and 14th days.

The utilization of carbon compounds by *S. caelestis* in a synthetic medium is shown in Table II. The procedure of Pridham and Gottlieb, J. Bact., 56, 107–114 (1948), was followed with the following modifications:

(1) Shake flasks were inoculated with *S. caelestis* spores and incubated at 28 degrees centigrade on a reciprocal shaker.

(2) After 48 hours, the supernatant was decanted. The vegetative growth was washed with 100 milliliters of sterile distilled water and the supernatant was again decanted. Then 100 milliliters of sterile distilled water was added and the mixture was incubated at 28 degrees centigrade on a reciprocal shaker.

(3) After 48 hours, the supernatant was decanted. The vegetative growth was washed as described above and blended in 100 milliliters of sterile distilled water in a Waring blender for one minute.

TABLE II

*Assimilation of carbon compounds by S. caelestis in the synthetic medium of Pridham and Gottlieb*

| Medium | Results | Medium | Results |
| --- | --- | --- | --- |
| Control | − | Soluble starch | (+) |
| d-xylose | + | glycerol | + |
| l arabinose | + | dulcitol | (−) |
| rhamnose | + | d mannitol | − |
| d fructose | + | d sorbitol | (−) |
| d galactose | + | dl inositol | + |
| d glucose | + | Na formate | ± |
| d mannose | + | Na oxalate | − |
| maltose | + | Na tartrate | − |
| sucrose | + | Na salicylate | − |
| lactose | + | Na acetate | + |
| cellobiose | + | Na citrate | (+) |
| raffinose | + | Na succinate | (+) |
| dextrin | + | | |
| Inulin | (−) | | |

+ = positive assimilation.
− = negative assimilation.
(+) = positive assimilation—only slight growth.
(−) = slight growth—no assimilation.

In all cases of assimilation, the aerial mycelium of *S. caelestis* was characterized by a powdery blue-gray color with traces of white.

The culture of *S. caelestis* produces long filamentous mycelia which branch profusely. The conidia are spherical to oval in form and are borne in loosely coiled sporophores arising from the aerial mycelium. When *S. caelestis* is grown on Bennett's agar, the aerial mycelium is characterized by a pale glaucous blue color. Further, a tan-brown pigment is produced in the medium. The colonies on Bennett's agar are slightly raised in the center with smooth margins tinged with a white coloration. The optimum temperature for sporulation of *S. caelestis* is between 28 and thirty degrees centigrade.

Although *S. caelestis* is similar in some respects to *S. glaucus* (Waksman and Lechevalier's "Actinomycetes and Their Antibiotics," page 91) and *S. chartreusis* (J.A.C.S., 75, 4011 [1953]), these microorganisms are readily distinguishable by marked differences in their cultural characteristics which are set forth in the following table:

TABLE III

*Distinguishing characteristics of S. caelestis, S. chartreusis K–180 and S. glaucus*

| Medium | Reaction | | |
| --- | --- | --- | --- |
| | S. caelestis | S. chartreusis K180 | S. glaucus |
| Potato | Growth good, grayish to blue white with darkening of slant. | Growth fair. Center of colonies blue-gray with white edges. | Growth heavy covered with velvety, green aerial mycelium. |
| Milk | No peptonization. | Slowly peptonized. | Peptonization slow, with prior coagulation by some strains. |
| Starch | No hydrolysis | Good hydrolysis | Hydrolysis rapid. |
| Nitrate | No reduction on medium used. | Reduction | Reduction. |

As noted above, *S. caelestis*, NRRL 2418, can be grown in a culture medium to produce an effective antibiotic material. The culture medium can be any one of a number of media as is apparent from the above described utilization tests. The organism is capable of assimilating many energy sources. However, for economy of production, maximum yield of antibiotic, and ease of isolation of celesticetin certain culture media are preferable. For example, the presently preferred sources of carbohydrate in the culture medium are brown sugar, lactose, and dextrin. Other sources which may be included are starch, sucrose, molasses, and the like. The preferred nitrogen sources are corn steep liquor, brewer's yeast, and distiller's solubles, but other sources which are utilizable include soybean meal or flour, casein, amino acid mixtures, peptones (meat and soy), and the like.

The nutrient inorganic salts which can be incorporated in the medium include the salts capable of yielding ions such as sodium, potassium, calcium, phosphate, chloride, sulfate, and the like. Inorganic nitrogen sources such as nitrate salts or ammonium salts can also be employed.

Essential trace elements should also be included in the culture medium for growing *S. caelestis*. Such trace elements are commonly supplied as impurities incidental to the addition of the other constituents of the medium.

For maximum growth and development of *S. caelestis*, NRRL 2418, the culture medium, prior to inoculation with the organism, should be adjusted to a pH between about 6.5 and about 7.5 and preferably adjusted to a pH of about 7.0. It has been observed that during the growth period of the organism and the production of the antibiotic, the medium gradually becomes alkaline and may attain an alkalinity between a pH of about 8.0 and about 8.5, or higher, the final pH being dependent, at least in part, on the initial pH of the medium the buffers present in the medium, and the period of time during which the organism is permitted to grow.

Submerged, aerobic culture conditions are the conditions of choice for the production of large amounts of celesticetin. For the preparation of limited amounts of celesticetin, shake flasks and surface cultures in bottles can be employed. When growth is carried out in large tanks, it is preferable to use the vegetative form of the organism for inoculation of the production tanks to avoid a pronounced lag in the production of the antibiotic and the attendant inefficient utilization of the equipment. Accordingly, it is desirable first to produce a vegetative inoculum of the organism by inoculating a relatively small amount of culture medium with the spore form of the organism, and when a young, active vegetative inoculum has been secured, the vegetative inoculum is transferred aseptically to the large tanks. The medium in which the vegetative inoculum is produced can be the same as, or different from, that utilized for the production of the antibiotic.

*S. caelestis*, NRRL 2418, can be satisfactorily grown at temperatures between about twenty and about 32 degrees centigrade. Optimum yields of celesticetin are obtained when the culture medium is maintained at a temperature between about 24 and about 28 degrees centigrade.

The rate of production of celesticetin and the concentration of the antibiotic activity in the culture medium can readily be followed during the growth period of the microorganism by testing samples of the culture medium for their antibiotic activity against organisms known to be susceptible to the antibiotic, for example, B. subtilis. For such determinations, it is convenient to employ a test which comprises making serial dilutions of the culture samples, adding portions of the diluted samples to melted nutrient agar, solidifying the agar in a Petri dish, inoculating the plate with a young culture of B. subtilis, and determining the greatest dilution of the culture medium which causes complete inhibition of the growth of organism on the nutrient agar.

The production of celesticetin can also be followed by turbidimetric test procedures such as are commonly employed in connection with the production of other antibiotics.

In general, maximum production of the antibiotic after inoculation of the culture medium occurs between about two and about six days when submerged aerobic cultures are employed, and between about four and about eight days when surface or shake flask cultures are used.

The antibiotic of this invention can be recovered from the culture medium by extractive or adsorptive techniques. The former are preferred for commercial production inasmuch as they are less time-consuming and expensive. For the extraction of the antibiotic compound from the culture medium, water-immiscible, polar organic solvents are preferred such as chlorinated hydrocarbons, for example, methylene chloride, ethylene dichloride, chloroform, and the like; alcohols having slight water-solubiltiy such as butanol, amyl alcohol, and the like; alkyl esters of fatty acids such as ethyl acetate, propyl acetate, butyl acetate, amyl acetate, and the like; ketones characterized by slight water-solubility such as methyl isobutyl ketone, methyl amyl ketone, and the like. Other solvents of similar character can likewise be employed. The extract of the culture broth can be evaporated to dryness, preferably in vacuo, to yield the antibiotic in crude form.

Alternatively, celesticetin can be separated from the culture broth by contracting the filtered broth with an adsorbing agent. Adsorbing agents such as activated alumina, silica gel, magnesium aluminum silicate, and the like, can be used effectively for purification by adsorption chromatography. Activated carbon can likewise be employed since carbon strongly adsorbs the antibiotic. It is preferable, however, to pre-treat the carbon adsorbent with an agent, e.g., acetic acid, in order to decrease the strong bonding affinity of the carbon for the antibiotic and thereby facilitate elution of the antibiotic. Elution of the antibiotic from the adsorbent is readily effected by employing a polar organic solvent in which the antibiotic compound is soluble.

Where an extractive process alone is employed for recovering celesticetin, a suitable method for its recovery from the extraction solvent comprises the concentration of the solvent to a relatively small volume, and the precipitation of the antibiotic from the solvent by the addition of a miscible solvent in which the antibiotic has slight solubility. The antibiotic material precipitates as the free base in a crude, but solid form.

A presently preferred manner of isolating celesticetin in the form of its base is to adjust the filtered culture broth to a pH between about six and about ten, and preferably between about 7.5 and about eight, and then to extract the broth with a water-immiscible organic solvent such as amyl acetate, butanol, ethyl acetate, methylene chloride, or the like. The extract is then evaporated to dryness and the residue is added to a liquid, saturated hydrocarbon having between five and eight carbon atoms, preferably, to a six carbon hydrocarbon such as hexane, to produce an amorphous precipitate. The precipitate is filtered and dried to obtain the antibiotic in the form of its free base.

The acid addition salts of celesticetin can be obtained by treating a solution of celesticetin in an organic solvent such as methanol, ethyl acetate, methylene chloride, or the like, with an equivalent amount of acid, e.g., gaseous hydrogen chloride, oxolic acid, salicylic acid, citric acid, and the like, and evaporating the solution to dryness. Alternatively, a solution of celesticetin in an organic solvent can be treated with a selected acid or a solution thereof, and the celesticetin acid addition salt precipitated directly from the solution.

Illustrative examples of salts which have been prepared are the hydrochloride, oxalate and salicylate. Other salts such as the citrate, benzoate, sulfate, and the like, can readily be prepared by the above mentioned procedures. For therapeutic purposes, the salt chosen should obviously be non-toxic.

The invention is not to be limited to the production of celesticetin by S. caelestis or by organisms fully answering the above description and given merely for illustrative purposes only. It is to be understood that the fermentative processes of this invention also embrace other celesticetin-producing strains of S. caelestis, such strains being readily produced and isolated by routinely applied isolation and strain-modification methods which include selection of cultured organisms and exposure of organisms to modifying means such as X-ray, ultraviolet light and chemical agents such as, for example, nitrogen mustards.

Celesticetin and its acid addition salts are characterized by a broad antibacterial spectrum, particularly against gram-positive bacteria. The activity of celesticetin as compared with streptomycin against illustrative organisms is shown in the following table:

TABLE IV

*Antibacterial spectrum*
*Minimal inhibitory concentration (mcg./ml.)*

| Organism | celesticetin | streptomycin |
| --- | --- | --- |
| D. pneumoniae | .39 | 25 |
| S. viridans 25-11 | 3.1 | 50 |
| S. viridans L-17 | 6.2 | >100 |
| S. hemolyticus C 203 | .19 | .19 |
| S. hemolyticus L-2 | .78 | 3.1 |
| S. agalactiae 7077 | 1.5 | 100 |
| M. pyogenes var. aureus L-40 | .39 | >100 |
| M. pyogenes var. aureus M-1 | 1.5 | 3.1 |
| M. pyogenes var. aureus 284 | .78 | 1.5 |
| S. albus | 2.5 | .05 |
| S. fecalis | 2.5 | .1 |
| B. anthracis | 2.5 | .05 |

The antibiotic activities were determined by streak-dilution or by broth-dilution tests. In the former test, the test organisms were streaked on a series of agar plates containing different concentrations of the antibiotic to determine the minimum concentration of celesticetin in mcg./ml. of substrate which inhibited growth over a period of forty hours. In the latter test, the test organisms were grown in nutrient broth containing different amounts of celesticetin.

Celesticetin exhibits activity against Nocardia asteroides, the causative organism of actinomycosis in animals and man, and is also active against Xanthomonas pruni, Phytomonas fasciculata and Phytomonas stewartii, bacteria which cause diseases in plants of economic significance. Since toxicity tests show no damage to apple and pear foliage at a concentration of 1000 parts per million of celesticetin, the antibiotic is useful in combating fire blight in apple and pear trees.

Celesticetin, either alone or in combination with antibiotics such as oxytetracycline, chlorotetracycline, penicillin, streptomycin, actidione, and the like, can be used in the treatment of plant diseases of economic importance such as bacterial spot of tomatoes and peppers, walnut blight, halo blight of beans, various turf diseases, mint rust, cherry leaf spot, and the like.

Celesticetin, because of its low toxicity, is suitable for treating a variety of infections in humans. Applied in the form of ointments or other suitable preparations, it is effective in the topical treatment of certain skin infections. Administered in suitable oral dosage form, it is effective in combating respiratory infections such as pneumonia. It is therapeutically useful in combination with antibiotics; sulfa compounds; steroid hormones such as cortisone, hydrocortisone and the 9α-fluoro analogues thereof; estrogens; analgesics, such as the salicylates; antihistaminics, such as pyrrolazote; pyribenzamine; and the like. Celesticetin can also be used as a feed supplement in promoting the growth of animals and poultry either alone or in combination with one or more of the aforementioned antibiotic materials. Its use is also indicated in combination with antifungal materials such as caprylic acid, undecylenic acid, p-hydroxybenzoic acid, and the like.

The following examples illustrate the formation, recovery, concentration, purification, and the identification of celesticetin and acid addition salts thereof. These examples are merely illustrative in nature and are not to be construed as limiting.

EXAMPLE 1

*Formation of celesticetin*

To each of a series of 500-milliliter Erlenmeyer flasks were added 100 milliliters of the following medium:

|  | Grams |
|---|---|
| Bacto peptone (Difco) | 7.5 |
| Yeast extract (Difco) | 2.5 |
| Glucose | 5.0 |
| Distiller water up to 1000 milliliters. | |

The flasks were autoclaved at 121 degrees centigrade for twenty minutes. After cooling, the flasks were inoculated with an aqueous spore suspension obtained from a conventional casein-starch agar slant and this was followed by incubation for approximately 48 hours at a temperature between 24 and 28 degrees centigrade on a reciprocating shaker. Five milliliters of this vegetative seed medium were used to inoculate each of a series of 500-milliliter Erlenmeyer flasks containing 100-milliliter aliquots of the following medium:

|  | Grams |
|---|---|
| Brown sugar | 10 |
| Glycerol | 5 |
| Lactose | 5 |
| Dextrin | 5 |
| Brewer's yeast | 5 |
| S.V.P.[1] (distiller's solubles) | 5 |
| $NH_4NO_3$ | 2 |
| Corn steep liquor | 2 |
| $CaCO_3$ | 4 |
| NaCl | 5 |
| Water up to 1000 cc. | |

[1] S.V.P.=a soluble vegetable protein mixture sold by Glenmore Distilleries, Inc.

Prior to seeding, the flasks were autoclaved at 121 degrees centigrade for twenty minutes and then cooled. The flasks were incubated at a temperature between 24 and 28 degrees centigrade on a reciprocating shaker. After a period of 120 hours, a sample of the fermented culture medium assayed 87 *M. avium* units per milliliter and 180 *B. subtilis* units per milliliter.

Assays were run by the procedure of Loo et al. (J. Bact., 50, 701–709 [1945]) and are expressed in terms of *M. avium* units based on the streptomycin sulfate standard and in terms of *B. subtilis* units based on the neomycin sulfate standard. Each *M. avium* unit is equivalent to one microgram of streptomycin base on a plate activity basis and each *B. subtilis* unit is equivalent to one microgram of neomycin base on a plate activity basis.

EXAMPLE 2

*Formation of antibiotic D–25*

100-milliliter aliquots of the following medium:

|  | Grams |
|---|---|
| Cerelose (glucose monohydrate) | 20 |
| Soy flour | 10 |
| Brewer's yeast | 2.5 |
| $(NH_4)_2SO_4$ | 5 |
| KCl | 3 |
| $CaCO_3$ | 4 |
| Water up to 1000 milliliters. | | were added to 500 milliliter flasks which were then autoclaved at 121 degrees centigrade for twenty minutes. The cooled flasks were inoculated with five milliliters of the 48 hour vegetative seed described in Example 1 and the flasks were then incubated at a temperature between 24 and 28 degrees centigrade on a reciprocating shaker. After 120 hours, a sample of the fermented culture medium assayed 21 *M. avium* units per milliliter and more than eighty *B. subtilis* units per milliliter.

EXAMPLE 3

*Formation and recovery of antibiotic D–52*

A 100-gallon stainless steel tank was filled with 240 liters of the following fermentation medium:

| Ingredient: | Grams/liter |
|---|---|
| Brown sugar | 10 |
| Glycerol | 5 |
| Lactose | 5 |
| Dextrin | 5 |
| Brewer's yeast | 2 |
| S.V.P. | 5 |
| $NH_4NO_3$ | 2 |
| Corn steep liquor | 2 |
| $CaCO_3$ | 4 |
| NaCl | 5 | and the medium was autoclaved for thirty minutes at 121 degrees centigrade, and then cooled. The tank was then inoculated with twelve liters of a vegetative seed prepared in the following manner:

Spores of *S. caelestis* obtained from a casein-starch agar slant were used to inoculate a 500 milliliter flask containing 100 milliliters of the following seed medium:

| Ingredient: | Grams/liter |
|---|---|
| Cerelose | 20 |
| Soy flour | 10 |
| Brewer's yeast | 2.5 |
| $(NH_4)_2SO_4$ | 5 |
| KCl | 3 |
| $CaCO_3$ | 4 |

The 500 milliliter flask was incubated at 28 degrees centigrade for 48 hours on a reciprocating shaker. A 25 milliliter aliquot of this culture was used to inoculate a five-gallon stainless steel fermenter, containing twelve liters of the above described seed medium. The fermenter had been previously autoclaved for one and one-half hours at 121 degrees centigrade and then cooled. The five-gallon fermenter was incubated at 28 degrees centigrade for two days. During this period of time the fermenter was agitated with a sweep stirrer and aerated at the rate of six liters per minute. This was the seed medium.

The 10 gallon tank was agitated by means of a shrouded impeller with a draft tube baffle. The propeller was rotated at the rate of 280 r.p.m. Air was supplied at the rate of three cubic feet per minute. To the fermentation culture was added 100 milliliters of an anti-foam material consisting of lard oil (Swift, prime burning lard oil) and one percent octadecanol.

After a period of 67 hours, a 1500 milliliter aliquot of beer was filtered and extracted with two 500-milliliter portions of methylene chloride; the pH of the aliquot was 7.8. The extract was concentrated to two milliliters under reduced pressure and then added to ten milliliters of Skellysolve B, a solvent comprising, largely, a mixture of hexanes. A flocculent precipitate was obtained. After washing with fifty milliliters of Skellysolve B and drying in vacuo, 38 milligrams (43 percent yield) of celesticetin was obtained assaying 2700 $B.$ $subtilis$ units per milligram and 720 $M.$ $avium$ units per milligram.

Celesticetin thus prepared was characterized as follows: (a) by having good stability in the pH range between two and seven for three hours at eighty degrees centigrade but with lower stability at a pH of ten at 25 degrees centigrade for three hours; (b) by being soluble in water in the pH ranges of pH one to 6.5 and pH 10.5 and 13, but not at pH seven to ten, indicating that it is amphoteric; (c) by being insoluble in 6 N NaOH; (d) by being soluble in methanol, chloroform, ethyl acetate, and methylene chloride but insoluble in ether and ligroin; (e) by forming water-soluble acid addition salts; (f) by ultraviolet absorption maxima of $$E_{1\ cm.}^{1\%} = 182$$

at 239 millimicrons and $$E_{1\ cm.}^{1\%} = 74$$

at 307 millimicrons; and (g) by an optical rotation of $[\alpha]_D^{24} = +121.5$ degrees (0.5 percent, in chloroform).

Also a suspension of celesticetin thus prepared mulled in liquid petrolatum exhibited the following characteristic absorption bands in the infrared, expressed in reciprocal centimeters: 3340, 3210, 1900, 1672, 1655, 1615, 1570, 1545, 1488, 1090 and 758.

EXAMPLE 4

*Preparation of celesticetin hydrochloride*

A methylene chloride solution containing 750 milligrams of celesticetin (Example 3) was treated with dry hydrogen chloride. On evaporation, a gummy residue was obtained. After trituration of this residue with anhydrous ether, 435 milligrams of a white, semi-crystalline powder was obtained which was identified as celesticetin hydrochloride. This material assayed 1650 $M.$ $avium$ units per milligram and 2200 $B.$ $subtilis$ units per milligram.

Celesticetin hydrochloride thus obtained was characterized by ultraviolet absorption maxima of $$E_{1\ cm.}^{1\%} = 188$$

at 240 millimicrons and $$E_{1\ cm.}^{1\%} = 67$$

at 305 millimicrons; by an optical rotation of $[\alpha]_D^{24} = +96.7$ degrees (0.5 percent, in water); also a suspension of the same mulled in liquid petrolatum exhibited the following characteristic absorption bands in the infrared expressed in reciprocal centimeters: 3290, 3065, 1671, 1613, 1583, 1566, 1485, 1088 and 755.

EXAMPLE 5

*Preparation of celesticetin oxalate*

A solution of forty milligrams of oxalic acid dihydrate and 200 milligrams of celesticetin (Example 3) in twenty milliliters of methanol was added to 120 milliliters of anhydrous ether. A precipitate of celesticetin oxalate was formed. On recrystallizing the resulting precipitate from methanol, there was obtained seventy milligrams of celesticetin oxalate in the form of white needles melting between 149 and 154 degrees centigrade. This material assayed 900 $M.$ $avium$ units per milligram and 4000 $B.$ $subtilis$ units per milligram.

*Analysis.*—Calcd. for $C_{24}H_{36}O_9N_2S \cdot \frac{1}{2}C_2H_2O_4$: C, 50.31; H, 6.45; N, 4.51; S, 5.17. Found: C, 50.72; H, 6.20; N, 4.75; S, 5.22.

Celesticetin oxalate thus obtained was characterized by ultraviolet absorption maxima of $$E_{1\ cm.}^{1\%} = 155.9$$

at 240 millimicrons and $$E_{1\ cm.}^{1\%} = 61.8$$

at 305 millimicrons and an optical rotation of $[\alpha]_D^{24} = +106.4$ degrees (0.5 percent, in water). Also a suspension of the same mulled in liquid petrolatum exhibited the following characteristic absorption bands in the infrared, expressed in reciprocal centimeters: 3600, 3460, 3265, 2540, 2206, 1935, 1720, 1689, 1674, 1625, 1589, 1545, 1486, 1085 and 756.

EXAMPLE 6

*Preparation of celesticetin oxalate*

A solution of 221 grams of celesticetin hydrochloride, as prepared in Example 4, in two liters of water was adjusted to pH eight with 6 N NaOH. This solution was extracted with three 500-milliliter volumes of methylene chloride. The methylene chloride extract was washed first with 100 milliliters of a five percent potassium bicarbonate solution, then with 200 milliliters of water. The washed methylene chloride extract was evaporated in vacuo to remove the methylene chloride and the remaining material was dissolved in 400 milliliters of methanol. To this solution was added 35 grams of oxalic acid and the mixture brought to a boil. After cooling and trituration, crystals formed. The crystals were washed with 100 milliliters of ethyl acetate, and dried in vacuo. The resulting crystals were dissolved in methanol and recrystallized to yield 104 grams of celesticetin oxalate which assayed 2450 units of $B.$ $subtilis$ per milligram, and 560 units of $M.$ $avium$ per milligram.

*Analysis.*—Calcd. for $C_{24}H_{36}O_9N_2S \cdot \frac{1}{2}C_2H_2O_4$: C, 50.31; H, 6.45; N, 4.51; S, 5.17. Found: C, 50.72; H, 6.20; N, 4.75; S, 5.22.

Figure 2:
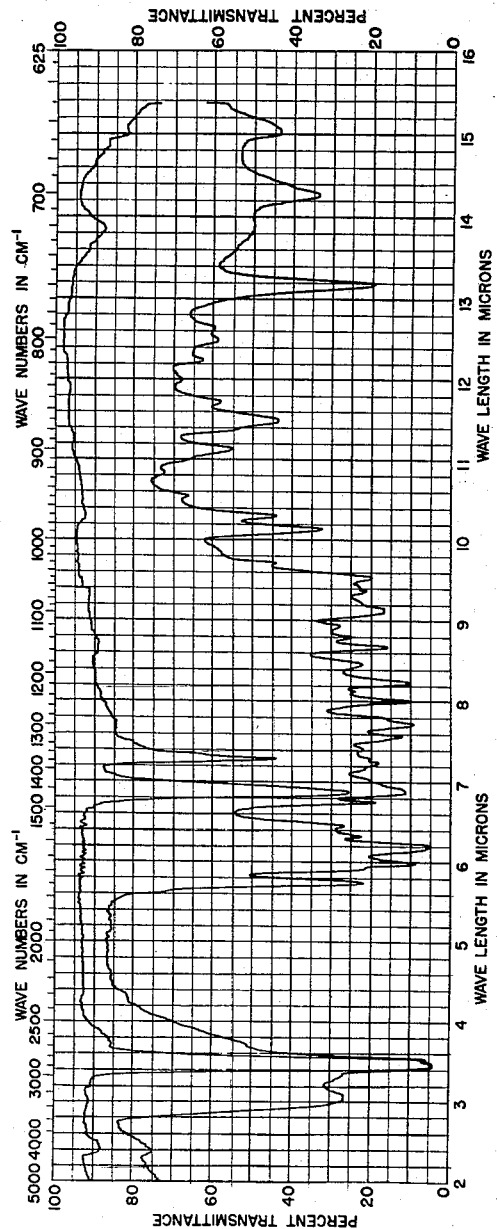

The celesticetin oxalate thus obtained was characterized by ultraviolet absorption maxima of $$E_{1\ cm.}^{1\%} = 158.0$$

at 239.5 millimicrons, and $$E_{1\ cm.}^{1\%} = 61.9$$

at 306 millimicrons. Also a suspension of celesticetin oxalate mulled in liquid petrolatum exhibited the characteristic infrared absorption spectrum shown in Figure 2. The characteristic absorption maxima are as follows:

| | | |
|---|---|---|
| 3265 | 1293 | 948 |
| 1730 | 1248 | 923 |
| 1685 | 1215 | 898 |
| 1670 | 1180 | 878 |
| 1610 | 1148 | 870 |
| 1575 | 1138 | 853 |
| 1550 | 1118 | 833 |
| 1480 | 1095 | 817 |
| 1429 | 1048 | 802 |
| 1395 | 1028 | 792 |
| 1350 | 983 | 758 |
| 1320 | 970 | 700 |

The following results were obtained in characterization studies for determining the structure of celesticetin oxalate:

| | |
|---|---|
| Nitroprusside | Negative. |
| Ferric chloride | Positive. |
| Millon's reagent | White precipitate. |
| Barium chloride | White precipitate acid soluble (no sulfate). |
| Iodoform | Negative. |
| Benzenesulfonyl chloride | Indefinite. |
| $Br_2$ in $CCl_4$ | Negative. |
| $Br_2$—$H_2O$ | White precipitate (aryl amine or phenol group). |
| $NaN_3$—$I_2$ | $N_2$ gas liberated (C—SH or C=S). |
| $H_2$—$PtO_2$ catalyst | No reduction. Retains ultraviolet spectrum. |

The intraperitoneal toxicities of celesticetin, celesticetin oxalate, chlorotetracycline and tetracycline are given in the following table:

TABLE V

Acute toxicity

[Mg./kg. in mice]

| Antibiotic: | $LD_{50}$ (mg./kg.) |
|---|---|
| Celesticetin-free base | 167. |
| Celesticetin oxalate | 233. |
| Chlorotetracycline | 192 (average). |
| Tetracycline | 190 (average). |

EXAMPLE 7

Recovery of celesticetin free base from its acid addition salt

Two grams of celesticetin oxalate (Example 5) was dissolved in twenty milliliters of water. The pH of the solution was raised to pH 8.5 by the addition of 6 N NaOH and an oily precipitate formed which was extracted with twenty milliliters of methylene chloride. The extract was dried over sodium sulfate and then evaporated to dryness under reduced pressure. There was obtained 750 milligrams of an amorphous substantially colorless material which was identified as celesticetin free base. The free base assayed 900 M. avium units per milligram and 2700 B. subtilis units per milligram.

EXAMPLE 8

Preparation of celesticetin free base from its acid addition salt

A solution of five grams of celesticetin oxalate (Example 6) in fifty milliliters of water was adjusted to pH 8.5 with 6 N sodium hydroxide, and a precipitate was formed. Fifty milliliters of methylene chloride was added and the mixture was stirred. 6 N sodium hydroxide was added as required to hold the pH at about pH 8.5. The methylene chloride extract was recovered and dried with sodium sulfate. The dry solution was evaporated to dryness in vacuo. The residue was dissolved in fifty milliliters of Skellysolve B and crystallized therefrom by trituration to yield 2.6 grams of celesticetin free base.

Analysis.—Calcd. for $C_{24}H_{36}O_9N_2S$: C, 54.58; H, 7.25; N, 5.28; S, 6.04. Found: C, 54.87; H, 6.75; N, 5.30; S, 6.02.

The celesticetin free base, thus obtained was characterized, as shown in Figure 4, by ultraviolet absorption maxima and minima as follows: (1) in 95 percent ethanol by maxima of $$E_{1\ cm.}^{1\%} = 192$$

at 239 millimicrons, and $$E_{1\ cm.}^{1\%} = 84$$

at 307 millimicrons, and by minima of $$E_{1\ cm.}^{1\%} = 4$$

at 266 millimicrons; (2) in 0.01 N sulfuric acid in 95 percent ethanol by maxima of $$E_{1\ cm.}^{1\%} = 194$$

at 240 millimicrons, and of $$E_{1\ cm.}^{1\%} = 85$$

at 310 millimicrons, and by minima of $$E_{1\ cm.}^{1\%} = 4$$

at 266 millimicrons; and (3) in 0.01 N potassium hydroxide in 95 percent ethanol by maxima of $$E_{1\ cm.}^{1\%} = 118$$

at 238 millimicrons, of $$E_{1\ cm.}^{1\%} = 125$$

at 244 millimicrons, and of $$E_{1\ cm.}^{1\%} = 92$$

at 338 millimicrons, and by minima of $$E_{1\ cm.}^{1\%} = 3.5$$

at 274 millimicons; and by an optical rotation of $[\alpha]_D^{24} = +126.6$ degrees (0.5 percent, in chloroform).

It was also characterized by the infrared absorption spectrum shown in Figure 1 of the drawing, obtained from a suspension of celesticetin free base mulled in liquid petrolatum. The significant absorption maxima are as follows:

| | |
|---|---|
| 3300 | 1086 |
| 1662 | 1050 |
| 1614 | 1033 |
| 1586 | 986 |
| 1519 | 965 |
| 1486 | 915 |
| 1340 | 899 |
| 1324 | 860 |
| 1300 | 815 |
| 1249 | 798 |
| 1214 | 756 |
| 1157 | 698 |
| 1136 | |

EXAMPLE 9

Preparation of celesticetin salicylate

On the addition of sixty milliliters of anhydrous ether to a solution of one gram of celesticetin (Example 3) and 0.27 gram of salicylic acid in ten milliliters of methanol, a gummy precipitate separated. After recrystallization from hot ethyl acetate, celesticetin salicylate was obtained melting between 136 and 138 degrees centigrade and assaying 720 M. avium units per milligram and 3800 B. subtilis units per milligram.

Celesticetin salicylate thus obtained was characterized by ultraviolet absorption maxima of $$E_{1\ cm.}^{1\%} = 227$$

at 236.5 millimicrons and $$E_{1\ cm.}^{1\%} = 106.7$$

at 301.5 millimicrons; by an optical rotation of $[\alpha]_D^{24} = +90.2$ degrees (0.5 percent, in water); by electrometric titration studies of celesticetin salicylate, using a mixture of water and 95 percent ethanol as a solvent, that indicated a basic function with a pKa of 7.80 and an acid group with a pKa of 9.90, and by an equivalent weight of 680±20 grams. Also a suspension of celesticetin salicylate mulled in liquid petrolatum exhibited the following characteristic absorption bands in the infrared, expressed in reciprocal centimeters: 3540, 3260, 3070, 1950, 1677, 1625, 1614, 1584, 1546, 1488, 1096, 1089, 776 and 764.

EXAMPLE 10

Preparation of celesticetin salicylate 40.85 grams of celesticetin (Example 3) was dissolved in twelve liters of hot ethyl acetate, 4.2 grams of salicylic acid was added, the mixture was stirred for twenty minutes at 1725 r.p.m., and then the mixture was evaporated under reduced pressure to about 100 milliliters. On refrigeration, a crystalline material was precipitated from the solution which was redissolved in two liters of hot ethyl acetate. The ethyl acetate extract was evaporated, under reduced pressure, to about 100 milliliters. On standing crystals precipitated. The crystals were filtered off and washed three times with fifty-milliliter aliquots of ethyl acetate, at two degrees centigrade, and air dried yielding 27 grams of celesticetin salicylate. The crystals were dissolved in two liters of hot ethyl acetate, the mixture was decolorized with 64 grams of activated carbon, and then filtered. The ethyl acetate extract of celesticetin salicylate was evaporated, under reduced pressure, to about 100 milliliters. There precipitated crystals which were filtered and washed twice with fifty-milliliter aliquots of ethyl acetate, at two degrees centigrade, and air dried yielding 25.2 grams of celesticetin salicylate, having a melting point of 136-7 degrees centigrade.

*Analysis.*—Calcd. for $C_{24}H_{36}O_9N_2S \cdot C_7H_6O_3$: C, 55.67; H, 6.62; N, 4.19; S, 4.79. Found: C, 55.70; H, 6.13; N, 4.21; S, 4.92.

Figure 3:
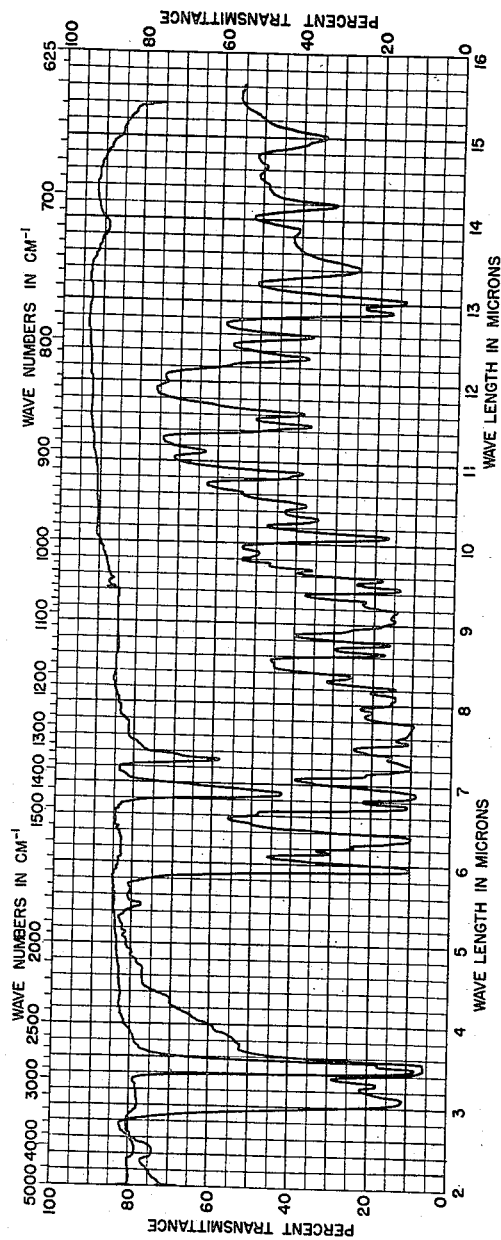

The celesticetin salicylate thus obtained was characterized by ultraviolet absorption maxima of $$E_{1\,cm.}^{1\%} = 168.5$$

at 239 millimicrons and of $$E_{1\,cm.}^{1\%} = 81.25$$

at 308 millimicrons and by the exhibited characteristic infrared absorption spectrum shown in Figure 3 of the drawing, obtained from a suspension of celesticetin salicylate mulled in liquid petrolatum. The significant absorption maxima are as follows:

| | | |
|---|---|---|
| 3270 | 1328 | 985 |
| 3100 | 1290 | 966 |
| 1682 | 1248 | 950 |
| 1630 | 1235 | 916 |
| 1610 | 1218 | 866 |
| 1580 | 1196 | 855 |
| 1546 | 1158 | 805 |
| 1518 | 1140 | 789 |
| 1488 | 1103 | 769 |
| 1458 | 1090 | 759 |
| 1409 | 1077 | 737 |
| 1388 | 1057 | 715 |
| 1360 | 1043 | 698 |

It is to be understood that the invention is not to be limited to the exact details of operation, exact compounds shown, or exact examples given and described herein, as obvious modifications and equivalents will be apparent to one skilled in the art, and the invention is therefore to be limited only by the scope of the appended claims.

We claim:

1. A method of producing an antibiotic material which comprises cultivating under aerobic conditions a celesticetin-producing strain of *Streptomyces caelestis* in a culture medium containing assimilable sources of carbohydrate, nitrogen and inorganic salts, until celesticetin is produced by said organism in said culture medium, and recovering said antibiotic material in the form of a celesticetin-containing concentrate, said celesticetin being an antibiotic substance as described in claim 6.

2. A method of producing celesticetin, an antibiotic substance as described in claim 6, which comprises cultivating under submerged aerobic conditions a celesticetin-producing strain of *Streptomyces caelestis* in a culture medium containing assimilable sources of carbohydrate, nitrogen, and inorganic salts until celesticetin is produced by said organism in said culture medium, and recovering the celesticetin from said culture medium.

3. A method according to claim 2 in which the organism is *Streptomyces caelestic*, NRRL 2418.

4. A method according to claim 2 which includes the step of extracting the culture broth at a pH between about six and about ten with a water-immiscible, polar organic solvent for celesticetin.

5. A method according to claim 2 in which the culture medium is maintained at a temperature between about twenty and about 32 degrees centigrade, and the growth of the organism is carried out for a period of from two to five days.

6. An antibiotic substance of the group consisting of a nitrogenous base, celesticetin, and the acid addition salts thereof, said base having the following structural formula

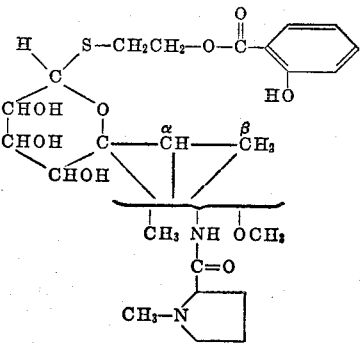

and having in its crystalline form the following properties: an ultraviolet absorption spectrum in aqueous solution exhibiting maxima of $$E_{1\,cm.}^{1\%} = 192$$

at 239 millimicrons and $$E_{1\,cm.}^{1\%} = 84$$

at 307 millimicrons, an optical rotation $[\alpha]_D^{24} = 126.6$ degrees (0.5 percent, in chloroform), and the infrared absorption spectrum shown in Figure 1.

7. The nitrogenous base as described in claim 6.

8. The hydrochloride salt of the nitrogenous base as described in claim 6.

9. As a new composition of matter useful on treatment with alkali as a source of celesticetin, the oxalate salt of the nitrogenous base as described in claim 6.

10. As a new composition of matter useful on treatment with alkali as a source of celesticetin, the salicylate salt of the nitrogenous base as described in claim 6.

11. A composition of matter consisting of the antibiotic substance of claim 6.

12. The nitrogen base as described in claim 6 in its essentially pure crystalline form.

References Cited in the file of this patent

Williams: The Review of Scientific Instruments, vol. 19, No. 3, 1948, page 142.

Waksman: The Actinomyces, 1950, pp. 116–117.

Waksman et al.: The Actinomyces and Their Antibiotics, 1953, pages 91 and 168–184.

Hoeksema et al.: Antibiotics Annual, 1954–1955, pages 837–841 (Antibiotic Symposium, 1954, pages 128 and 129).

De Boer et al.: Antibiotics Annual, 1954–1955, pages 831–841.

Baldacci et al.: Arch. für Mikrobiol., 20, Band 4, (Schluss) Helft, pages 347–357.